United States Patent [19]

Tazaki

[11] 4,315,268

[45] Feb. 9, 1982

[54] RECORDING APPARATUS

[75] Inventor: Shigemitsu Tazaki, Matsudo, Japan

[73] Assignee: Canon Kabushiki Kaisha, Tokyo, Japan

[21] Appl. No.: 151,701

[22] Filed: May 20, 1980

[30] Foreign Application Priority Data

Jun. 4, 1979 [JP] Japan ........................ 54-69618

[51] Int. Cl.[3] ........................ G01D 15/28

[52] U.S. Cl. ........................ 346/17; 318/135; 318/490; 346/75; 346/139 R; 400/322

[58] Field of Search ........................ 346/17, 75, 139 R, 140; 318/135, 490, 565; 400/126, 322; 340/680

[56] References Cited

U.S. PATENT DOCUMENTS

| | | | |
|---|---|---|---|
| 4,007,463 | 2/1977 | Fujimoto | 346/75 |
| 4,012,676 | 3/1977 | Giebler | 318/135 |
| 4,044,881 | 8/1977 | Caai | 400/322 X |

*Primary Examiner*—Joseph W. Hartary

*Attorney, Agent, or Firm*—Fitzpatrick, Cella, Harper & Scinto

[57] ABSTRACT

Recording apparatus utilizing a linear motor, having a mechanism for automatically stopping the motor in case of abnormal stopping of the carriage and an alarming mechanism for providing an alarm in the case of such abnormal carriage stopping.

5 Claims, 3 Drawing Figures

RECORDING APPARATUS

BACKGROUND OF THE INVENTION

1. Field of the Invention

The present invention relates to a safety and alarm device for use in recording apparatus utilizing a linear motor.

2. Description of the Prior Art

FIG. 1 shows an example of the recording apparatus in which a carriage CA is reciprocally driven along a guide member Y2 by means of a linear motor. Detection of the print positions and printing speed control are achieved by a non-magnetic optical slit plate OS. The linear motor is provided with a closed magnetic circuit composed of a permanent magnet PM, a magnetic plate Y1 and a magnetic guide member Y2. A coil C wound on a coil bobbin CB slidably mounted on the magnetic guide member Y2 is displaced under the Fleming's left hand law upon receipt of an electric current to drive a carriage CA structured integral with coil bobbin CB. The reciprocating motion of the carriage along the guide member Y2 is achieved by changing over in direction the electric current supplied to the coil winding C. A graduation plate, such as a non-magnetic optical slit plate OS, is fixed at both ends thereof the folded ends Y1T of the guide member Y2 so as to be parallel thereto. The carriage CA is provided with the coil bobbin CB, a printing head such as an ink jet nozzle NP and slit detecting means (not shown) such as a light-emitting diode and a phototransistor. The drive terminals of the coil C and ink jet nozzle NP, and the electrodes of the light-emitting diode and phototransistor are connected to a flexible cable FL of which the other end is connected to a connector (not shown), whereby the displacement of the carriage and the operation of the ink jet nozzle are controlled through the signal lines FLl of flexible cable FL.

The optical slit plate OS is positioned between the light-emitting diode and the phototransistor, and the phototransistor intermittently receives the infrared light from the light-emitting diode through the slits SS of the optical slit plate to detect the speed and position of the carriage CA in the scanning motion, thereby controlling the speed of scanning and the operations of the ink jet nozzle and the paper feeding stepping motor.

The printed characters are in the form of a dot matrix.

In response to a print instruction signal, the carriage CA initiates the displacement, and the carriage position is detected by the timing signals from the optical slit plate OS. In this manner drive signals are supplied to the ink jet nozzle at its determined position to shoot ink droplets therefrom, thereby performing printing on recording paper (not shown).

Upon completion of the printing operation the carriage CA is returned to the initial position (home position HO) in response to drive pulses of an inverted polarity, while the paper feeding is achieved by the stepping motor MO of which rotation is transmitted with reduction through a motor shaft gear (not shown) and gears G1, G2.

The final gear G2 is fixed on the shaft of the platen PL for feeding the paper by a determined amount in the vertical direction. Upon termination of the printing operation the nozzle NP is displaced to its home position HO having a cap KP, which functions to prevent clogging or drying of the ink jet nozzle and meniscus retraction in the nozzle.

In case, however, the reciprocating motion of the carrige CA along the guide member Y2 is hindered by some reason, for example, by the presence of dust or foreign matter, the motor continues to supply current to the coil C on the coil bobbin CB integral with the carriage CA until the motor is turned off, whereby the heat generated by the coil C may cause deformation of the coil bobbin CB or the breakage of the coil C, thus leading to defective carriage drivability or printing failure.

SUMMARY OF THE INVENTION

An object of the present invention is to prevent such drawback.

DESCRIPTION OF THE PREFERRED EMBODIMENT

Figure 1:
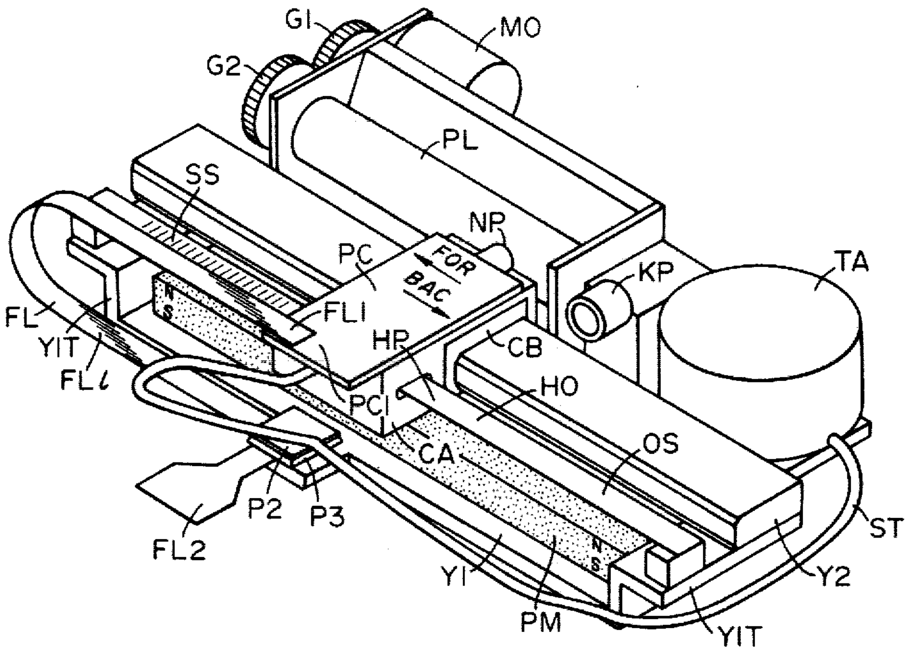
FIG. 1 is a perspective view showing an example of the recording apparatus to which the present invention is applicable.
Figure 2:
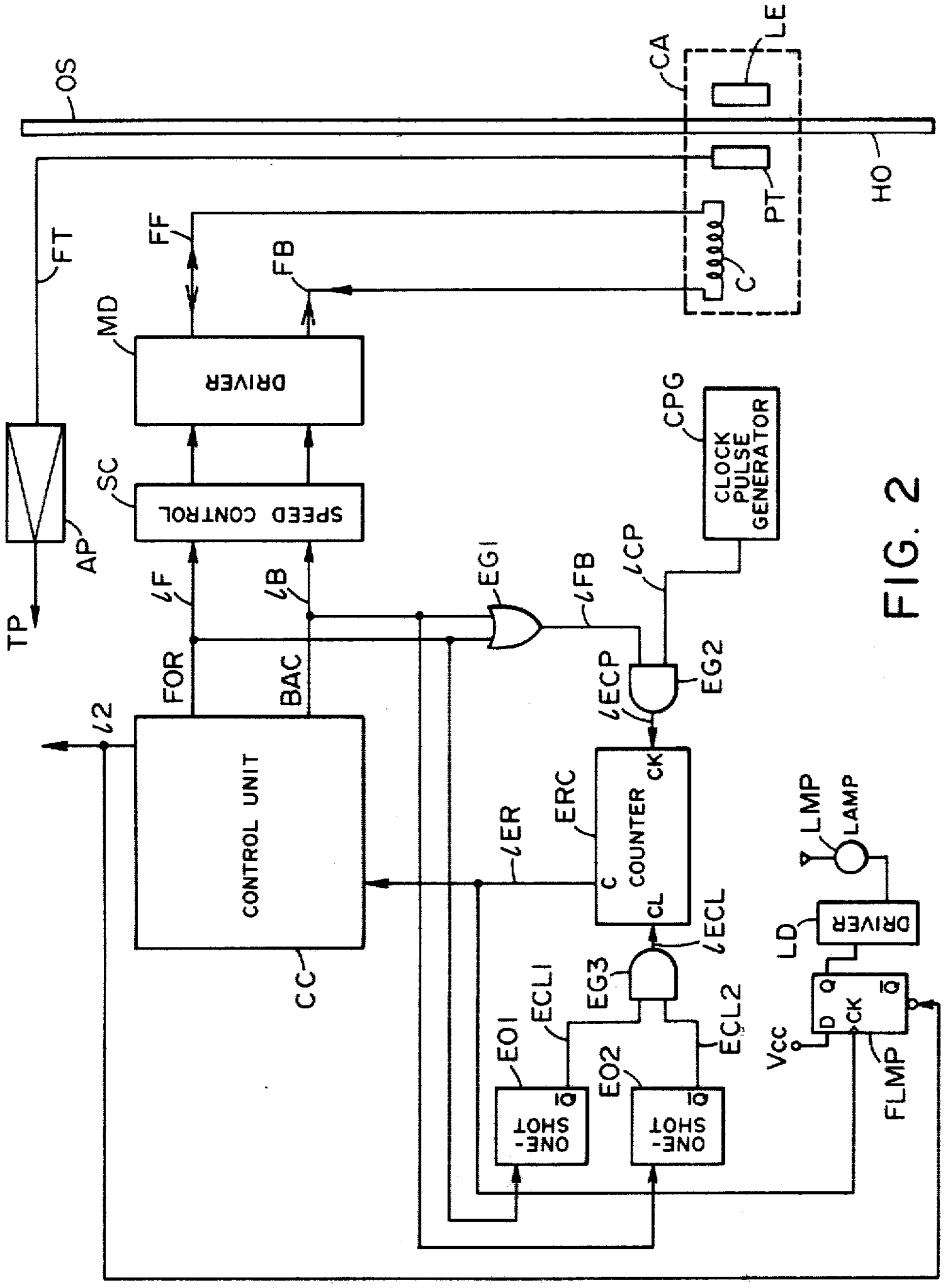
FIG. 2 is a schematic circuit diagram showing an embodiment of the drive circuit for the recording apparatus in accordance with the present invention.

In the circuit shown in FIG. 2, the reciprocating motion of the carriage CA during printing and the displacement thereof to the home position HO are achieved by current supply to the coil winding C through a speed control SC and a motor driver MD with a signal level 1.0 and 0.1 supplied to the signal lines lF and lB. During such displacement, the motion of the carriage may be hindered by some reason as explained in the foregoing. According to the present invention, therefore, there is provided a counter ERC which, in case of an abnormal stop of the carriage, automatically turns off the motor to prevent damage resulting from such abnormal stop and provides an alarm by means of a lamp or a buzzer on such abnormal state.

More specifically the counter ERC is designed set with a time period longer than the time required by the carriage CA for the forward displacement or for the backward displacement until the home position HO under the signals 1.0 and 0.1 from the control unit CC through the signal lines $l_F$, $l_B$, and transmits a signal to the control unit CC after the lapse of the selected time to stop the motor in operation and to interrupt the current to the coil C. For example, in case the carriage requires a time period in the order of several tens to several hundred milliseconds for the one-directional displacement, the counter ERC is selected to be enabled after a period of several seconds in order to avoid eventual damage to the coil C.

Now there will be given an explanation on the above-mentioned function during the course of printing while making reference to FIG. 3.

At the turning on of the power supply or at the start of a printing operation, the control unit CC maintains the signal line l2 at "0" level for a determined period to reset a flip-flop FLMP. At the initiation of the printing the signal lines lF and lB are respectively maintained at "1" and "0" to drive the carriage CA through the speed control SC and driver MD. In this state the output signal line lFB carries a "1" level signal through an OR gate EG1 to enable an AND gate EG2, whereby the clock pulses supplied from a clock pulse generator CPG through the signal line lCP are supplied over the signal line lECP for counting by the counter ERC. However, a one-shot multivibrator EO1 produces a "0" level signal on the signal line ECL1 at the changeover of the signal line lF to "1" while a one-shot multivibrator EO2 does not develop an output signal because of the "0" level state of the signal line lB to maintain the signal line ECL2 at the "1" level state. The counter ERC is in turn cleared by the output signal of an AND gate EG3 through the signal line lECL for the duration of the output signal from the one-shot multivibrator EO1 and initiates the counting of the clock pulses only after the lapse of the duration, i.e. after the output signal lECL from the AND gate EG3 is changed to "1". The counter ERC does not generate any output signal in its normal state since it is selected, as explained in the foregoing, to set a time period sufficiently longer than the time required for the forward or backward displacement of the carriage.

Figure 3:
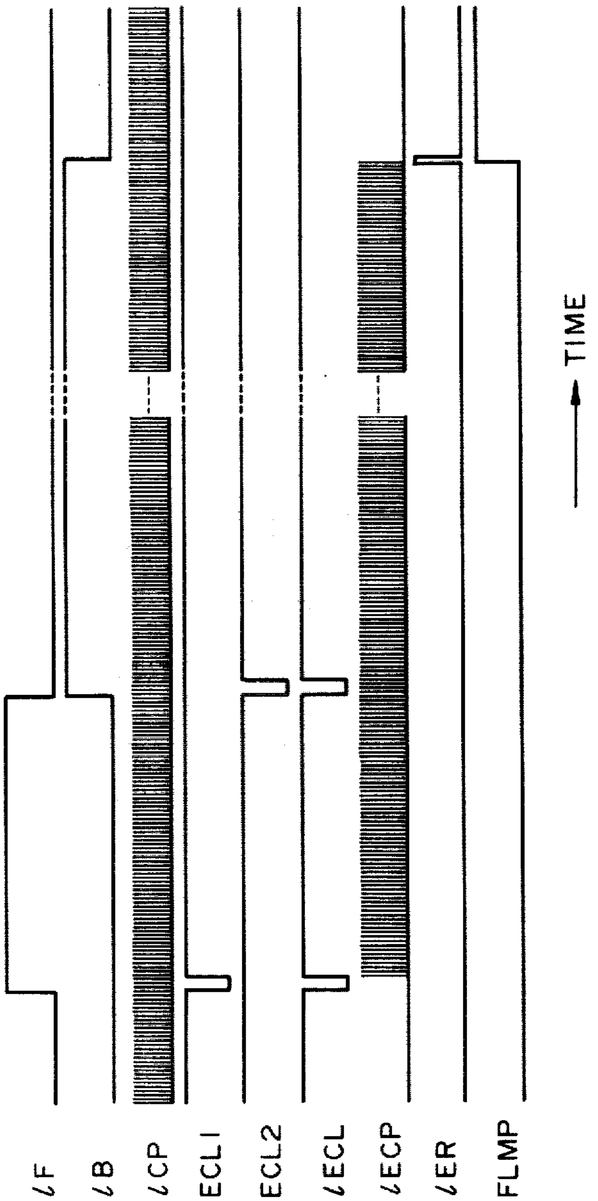
FIG. 3 shows waveforms for use in understanding the operations of the circuitry shown in FIG. 2.

Upon completion of the forward displacement of the carriage CA as shown in FIG. 3, the signal lines lF and lB are respectively shifted in state to "0" and "1" for the backward displacement of the carriage CA, whereby the one-shot multivibrator EO1 does not develop an output signal to maintain the signal line ECL1 at "1" while the one-shot multivibrator EO2 maintains the signal line ECL2 at "0" for a determined period from the changeover of the signal line lB to "1" level state thereby clearing the counter ERC. Thereafter, as the signal line lFB is maintained at "1" level state through OR gate EG1, the counter ERC counts the clock pulses supplied from the clock pulse generator CPG through the signal line lECP and AND gate EG2.

In case the carriage CA is stopped, for example, by the presence of foreign matter such as dust during the course of backward displacement with lF=0, the counter ERC continues counting longer than in its normal state as the signal line lB is maintained in the "1" level state.

Because of the longer duration of the state lB=1 than in the normal state, the counter ERC completes the counting up to the predetermined value to generate an output signal on the signal line lER.

Upon receipt thereof the control unit CC detects the abnormal state of the motor drive and terminates the motor drive by shifting the signal lines lF and lB in level to "0", thereby avoiding damage to the coil C. At the same time a flip-flop FLMP is set through the signal line lER to light a lamp LMP through the driver LD to give a warning on the abnormal state. The lamp may naturally be replaced by a buzzer.

The foregoing function takes place in the case of motor drive when the number of timing pulses TP is deficient during the printing operation. Also in case the home position is detected by means of the presence of a dark portion for a determined period on an optical slit plate OS, erroneous detection of the home position occurs if the carriage CA is stopped at a dark portion by a reason as explained above during the course of backward displacement to the home position and the printing operation is initiated from such erroneous home position. However, in such a case, there are activated the motor protection and alarm as explained before since the motor drive is continued with a deficient number of timing pulses TP because of the erroneous print start position.

As explained in the foregoing, the present invention allows, in recording apparatus utilizing a linear motor, rapid detection of the abnormal stopping of the motor, thus automatically stopping the motor to prevent damage in the coil etc. and giving an alarm by a lamp or a buzzer to the user of the apparatus. Upon actuation of the clear key or another alarm clear key after the user had eliminated the foreign matter advised by the alarm, the control unit CC produces a signal over the signal line l2 to set all the circuits to their initial states and to reset the flip-flop FLMP to extinguish the lamp LMP. Simultaneously the signal line lB is shited in state to "1" to displace the carriage CA to its home position, and then shifted to "0" upon receipt of the home position detection signal, whereby all the arrangements for the succeeding operation are readied.

What I claim is:

1. Recording apparatus comprising:

linear motor means;

a carriage having a printing head and displaceable by said linear motor means;

means for detecting an abnormal stop of said carriage; and means for stopping the driving of said linear motor means in response to said detecting means.

2. Recording apparatus according to claim 1, further comprising means for providing an alarm in response to said detecting means.

3. Recording apparatus according to claim 1, wherein said detecting means is set with reference to a determined time period for displacing said carriage.

4. Recording apparatus according to claim 1, wherein said printing head comprises an ink jet nozzle.

5. Recording apparatus according to claim 1, wherein said linear motor means comprises a permanent magnet and a moving coil which is mounted on said carriage.

* * * * *